United States Patent [19]

Flanagan

[11] Patent Number: 4,553,944

[45] Date of Patent: Nov. 19, 1985

[54] MATHEMATICAL TEACHING DEVICE

[76] Inventor: Maureen Flanagan, 49½ Silver St., Middletown, Conn. 06457

[21] Appl. No.: 699,578

[22] Filed: Feb. 8, 1985

[51] Int. Cl.⁴ .............................................. G09B 23/02
[52] U.S. Cl. .................................................. 434/191
[58] Field of Search ....................... 434/191, 205, 300

[56] References Cited

U.S. PATENT DOCUMENTS

| | | | |
|---|---|---|---|
| 1,483,916 | 2/1924 | Troidl | 434/191 |
| 2,842,870 | 7/1958 | Lilly | 434/205 |
| 3,209,470 | 10/1965 | Plumb | 434/300 |
| 3,874,096 | 4/1975 | Romstad | 434/205 X |

FOREIGN PATENT DOCUMENTS 1074815  7/1967  United Kingdom ................ 434/191

*Primary Examiner*—Harland S. Skogquist
*Attorney, Agent, or Firm*—Alan E. Steele

[57] ABSTRACT

An improved teaching device which aids abstract learning through visual and practical application. The device has three compartments which are enclosed with transparent face and back plates, a base, a top plate and side walls. Two interior plates and the side walls form the three compartments where one of the plates mounted on the base does not reach the top plate so that the two compartments it forms are not sealed off. The third compartment is formed by an interior plate mounted on the base and reaches the top plate, forming a common wall between one of the two previous compartments and the third compartment, and sealing of the third compartment. Enclosed in the third compartment is a number of items, such as marbles, the number of which are the sum of similar items dispersed in the two previous compartments. By turning the device upside down and shaking the items in the first two compartments will disperse into the two compartments in different combinations but the sum of the two compartments always remains the same and similar to the number in the third compartment.

10 Claims, 3 Drawing Figures

MATHEMATICAL TEACHING DEVICE

This invention relates to an improved device for aiding in teaching addition and substraction to pre-school children, elementary school children and older children having learning disabilities. The prior art devices have utilized cumbersome and intricate structure which require manipulative and mental skills that the child does not have, or are so confusing as to detract the child from the lesson to be learned. The device when used in the hands of children should be simple to manipulate and compact to fit the small hands of the children. The device should be visually attractive and functional without extraneous "gadgets" to manipulate.

In view of the above, the main object of this invention is to provide a simple device to aid children in learning of addition and subtraction.

Another object is to provide a mathematical learning device which utilizes visual means to explain the properties of addition and substraction.

Still another object is to provide an individualized mathematical learning device which can fit into the hands of small children.

Yet another object of this invention is to provide a mathematical learning device for children which reinforces their vocabulary on the properties of addition and substraction.

Other features and many attendant advantages of this invention will be readily appreciated as the invention becomes better understood from the following description taken in connection with the illustrative embodiments in the accompanying drawings wherein.

Figure 1:
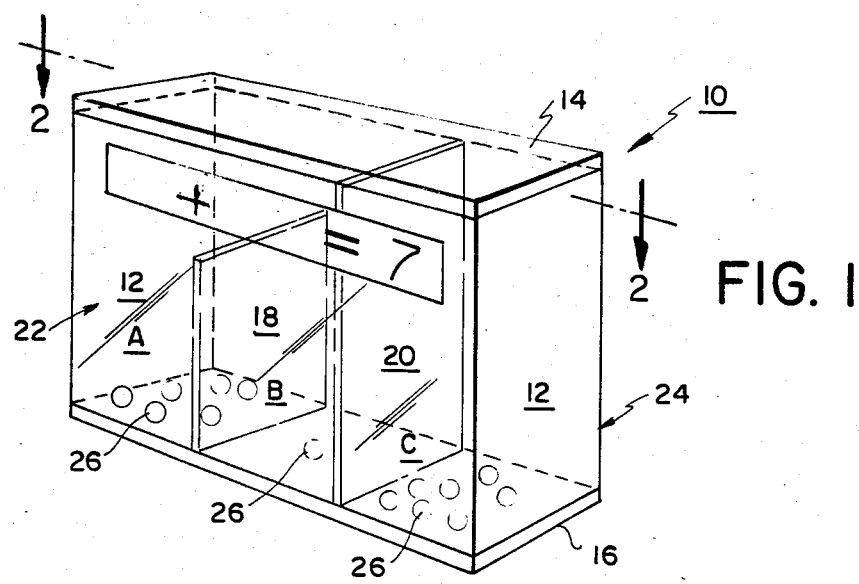
FIG. 1 shows a perspective view of the mathematical teaching device.

Referring to the drawings and initially to FIG. 1 there is seen an enclosed container 10 having three compartments labelled A, B and C. The container 10 is formed by a base 16, endwalls 12,12, a top plate 14, a face plate 22, and a back plate 24. The compartments A, B and C in container 10 are formed by a semi-interior plate 18 and a full interior plate 20 equidistantly spaced from endwalls 12,12 and essentially parallel to each other. Semi-interior plate 18 is affixed to base 16, and is approximately two thirds the height of endwalls 12,12. Full interior plate 20 is affixed to base 16 and to top plate 14 and forms a closed compartment C with one endwall 12. Semi-interior plate 18 forms semi-enclosed compartment A with the opposite end wall 12 and semi enclosed compartment B with full interior plate 20. Compartments A, B and C are sealed by face plate 20 and back plate 24. Face plate 20 is affixed to the base 16, top plate 14, and end walls 12,12, and abutting one of the sides of semi-interior plate 18 and full interior plate 20. Back plate 24 is also affixed to the base 16, top plate 14 and end walls 12,12 and abuts the other sides of semi-interior plate 18 and full interior plate 20. Prior to sealing the compartments A, B and C items, such as colored beads or marbles, are inserted into the compartments in such a way that the number of marbles sealed in compartment C is equal to the sum of the number of marbles inserted into compartments A and B. The face plate 22 has indicia near its top which has a plus (+) sign above semi-interior plate 18, an equal (=) sign in the ame plane as one end of full interior plate 20, and a number in compartment C equal to the number of items sealed in compartment C. Face plate 22 and back plate 24 are made of a transparent material such as lucite. The other plates or endwalls may also be made of the same material but is not essential to this invention. The base, plates and walls which are affixed may be affixed by an adhesive and/or fasteners (not shown).

Figure 2:
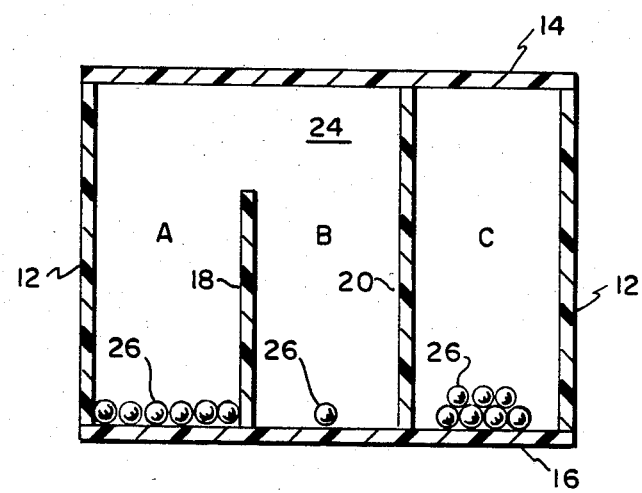
FIG. 2 shows a section through the center of the mathematical teaching device.

FIG. 2 is a section through container 10 showing compartments A, B and C with the items in each compartment, the opening at the top portion between compartments A and B and the sealed compartment C.

Figure 3:
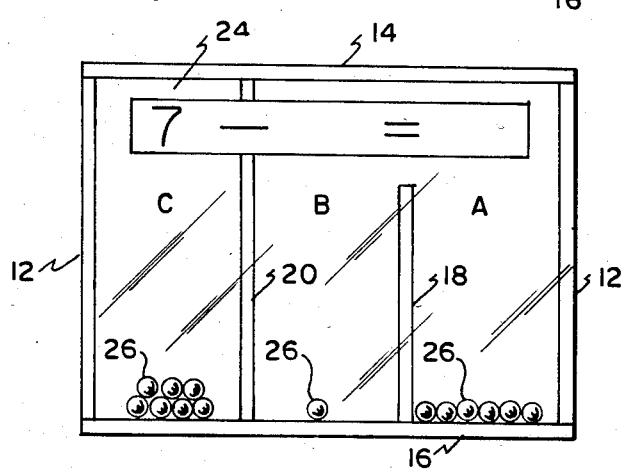
FIG. 3 shows a view looking at the back or opposite side of the mathematical teaching device.

FIG. 3 is a view of container 10 looking at the back plate 24 showing compartments A, B and C as described above, but now in the reverse order. The back plate 24 has indicia near its top portion which has a number in compartment C equal to the sum of the items in compartments B and C, a minus (−) sign in the same plane as the end of full interior plate 20, and an equal (=) sign above semi interior plate 18.

A child utilizes the teaching device in the following manner. With top plate 14 removed, the instructor inserts a number of items 26, into compartment C and an equal number of items 26 into compartment B. The top plate 14 is then affixed by the instructor to the endwalls 12,12 and plates 22 and 24 by fasteners or equivalent means, not shown. The indicia on the face plate and back plate has the number of items sealed in compartment C written on the indicia covering compartment C. This may be any number the instructor desires, however for our example we have used the number 7. The sealed container is then given by the child to manipulate. By looking at and through the face plate 22 the child sees no items in compartment A, seven items in compartment B and seven items in compartment C. The child can then visually see and/or write down on the indicia above each compartment the number of items in each compartment and logically follow the addition equation on the indicia of 0+7=7. The writing of the child is erased, but the number over compartment C is written in ink and remains. The child may then turn the container 10 upside down, and shake it vigorously from side to side and then place it upright sitting on base 16. When placed upright some of the items have shifted from compartment B to compartment A, as shown in our figures of six items now in compartment A and one in compartment B. The child now repeats the process of visualizing and/or writing on the indicia the equation of 6+1=7. This can be repeated any number of times by the child wherein the child sees all the combinations of addends which equal the sum 7. To help the child's vocabulary the word addend may be written above the indicia in compartment A and B and the word sum in compartment C.

On the reverse side of container 10, looking at back plate 24, the child sees the fixed number of items in compartment C from which is substracted the number of items in compartment B and equals the number of items in compartment A. The same process as described above for addition is looked at in reverse and amounts to subtraction. In FIG. 3 the child sees 7 items in compartment C, one item in compartment B and 6 times in compartment A and can visualize and/or write on the indicia the equation 7−1=6. Again this may be repeated by the child mixing the items in container A and B as described above to see the differences which result from the various subrahends from the number 7.

Having thus described the invention and advantages thereof, it will be understood that the foregoing disclosure relates not only to preferred embodiments of the invention, but it is also intended to cover all changes and modifications of the invention selected for the purpose of disclosure without departing from the true spirit and scope thereof.

I claim:

1. A mathematical teaching device for aiding young persons in learning the basics of mathematics comprising a closed container formed by a base, a top plate, a front plate, a back plate and endwalls, said container has a first panel forming a sealed first compartment with one endwall, base, top plate, face plate and back plate of said container, and the second panel forming a second compartment adjacent the first panel and a third compartment adjacent the other endwall of the container wherein said latter two compartments communicate with each other thorugh an opening formed in the second panel between said second and third compartments, a number of items sealed in said first compartment and a number of items located in said second and third compartments wherein the total items in the second and third compartments equals the number of items in the first compartment.

2. A mathematical teaching device of claim 1 wherein the front and back plates are made of transparent material.

3. A mathematical teaching device of claim 2 wherein indicia appears on the back plate indicating a numeral on the first compartment, a minus sign between the first and second compartments and an equal sign between the second and third compartments.

4. A mathematical teaching device of claim 2 wherein indicia appears on the front plate indicating a plus sign between the second and third compartments, an equal signal between the first and second compartments and a numeral on the first compartment.

5. A mathematical teaching device of claim 1 wherein the items are colored beads.

6. A mathematical teaching device of claim 4 wherein the first compartment is located at the right end of the container and the third compartment is at the left end of the container.

7. A mathematical teaching device of claim 3 wherein the first compartment is located at the left end of the container and the third compartment is located at the right end of the container.

8. A mathematical teaching device of claim 4 wherein indicia appears on the back plate indicating a numeral on the first compartment, a minus sign between the first and second compartments and an equal sign between the second and third compartments.

9. A mathematical teaching device for aiding young persons in learning the basics of mathematics comprising a container having a sealed compartment with a finite number of items sealed therein, and at least two compartments which communicate with each other through an opening in a wall common to these compartments, items dispersed in the latter compartments which total is equal to the number of items in the sealed compartment.

10. A mathematical teaching device of claim 9 wherein all the compartments are juxtapositioned in such a manner that adjoining compartments have at least one common wall between them.

* * * * *